(No Model.)
B. C. MEYER.
Grain-Meter.
No. 228,095. Patented May 25, 1880.
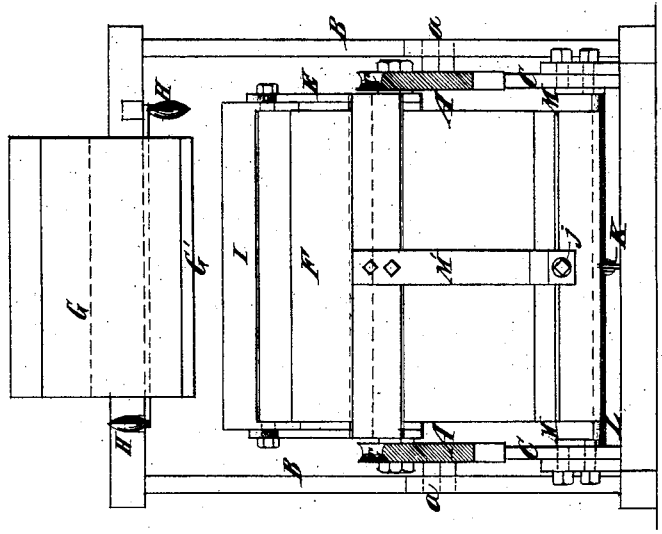
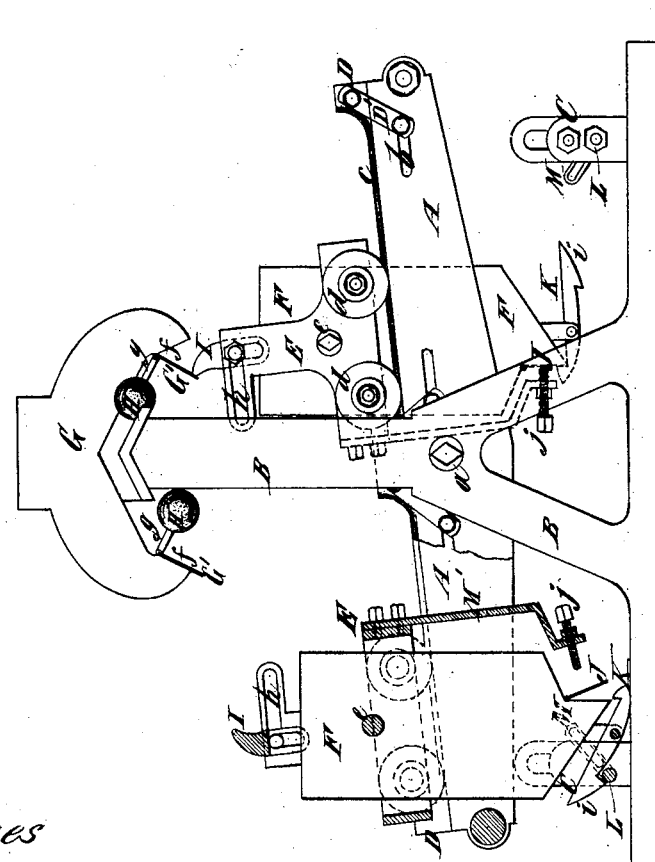
Witnesses
Fredr Haynes
Thomas E. Birch
Inventor:
Bernhard C. Meyer
by his Attorney
Brown & Brown

UNITED STATES PATENT OFFICE.

BERNHARD C. MEYER, OF BETHALTO, ILLINOIS.

GRAIN-METER.

SPECIFICATION forming part of Letters Patent No. 228,095, dated May 25, 1880.

Application filed April 10, 1880. (No model.)

*To all whom it may concern:*

Be it known that I, BERNHARD C. MEYER, of Bethalto, in the county of Madison and State of Illinois, have invented certain new and useful Improvements in Automatic Scales, of which the following is a specification.

My invention relates to automatic scales employed in weighing grain or other granulated or comminuted substances, in which two hoppers are arranged upon a vibrating beam, so as to move alternately toward or away from the center of vibration of said beam, and which also comprise a stationary hopper or hoppers, from which the weighing or movable hoppers receive the material to be weighed.

My invention consists in certain novel combinations of parts whereby the movable or weighing hoppers automatically open the outlets of the stationary hopper or hoppers to receive their supply, whereby the former hoppers are dumped and their outlet-orifices automatically closed, and whereby facility is afforded for the convenient adjustment of the various parts of the scale.

In the accompanying drawings, Figure 1 represents a side elevation and partial section of a scale or weighing apparatus embodying my invention, and Fig. 2 represents a transverse section through such apparatus.

Similar letters of reference designate corresponding parts in both figures.

A designates the beam, composed of two side pieces connected by stretchers and supported at its center upon knife-edge or anti-friction bearings $a$ in the side frames, B, of the scale, so as to vibrate vertically.

C designates stops or supports, here shown as adjustable, against which the ends of the beam strike in their downward movement, and which, consequently, limit the length of vibration of said beam.

D designates adjustable pieces secured to the side pieces of the beam by links D', and the side pieces of the beam have in them slots $b$, to provide for moving the pieces D toward or from the center of the beam, to properly balance it. The pieces D also serve the purpose of stops, as will be fully explained hereinafter. The upper surfaces of the side pieces of the beam A are rounded or otherwise formed, so as to constitute ways $c$. (Clearly represented in Fig. 2.)

E designates trucks provided with wheels $d$, which travel upon the ways $c$, and carrying hoppers F, which are supported on knife-edge bearings $e$ in said trucks.

It will be readily understood that a preponderating weight of material in either hopper F will tilt the beam and cause the truck carrying the heavier hopper to move away from the center of vibration, while the truck carrying the lighter hopper moves toward said center. The pieces D, secured to the side pieces of the beam, form stops to the wheels $d$ of the trucks E.

G designates a stationary supply-hopper, arranged at the top of the frame B, and provided with two orifices or delivery-outlets, $f$. These delivery-outlets are closed by valves or gates G', which are hinged at their upper sides and provided with weights H, to cause them to automatically close. In lieu of the weights, their equivalents, springs, might be employed. These weights may be shifted upon the levers $g$, supporting them, nearer to or farther from the hinge of the gates G', to offer the required resistance to the opening of the gates.

Each of the trucks E has extending from it a projecting piece, I, which, as the truck moves inward, engages with one of the gates G' and opens it, to permit the material contained in the hopper G to fall into one of the hoppers F. The trucks E are furnished with slots $h$, which provide for adjusting the projecting pieces I, so as to open the gates G any required distance.

At its lower side each hopper F is provided with an outlet or delivery orifice closed by a hinged valve or gate, J, and such valve or gate is held closed, to prevent the accidental escape of material, by a latch-dog, K, pivoted to the said hopper and hooked or notched to engage with said gate. The under surface of each latch-dog is inclined at $i$, and as either of the trucks E and its hopper F approach the end of the beam the inclined surface of said latch-dog rides over a cross-bar or abutment, L, thereby releasing the gate J and permitting the escape of the weighed material contained in the hopper into a bin or other receptacle provided for it. The cross-bars L are supported by links or arms M, which permit of their vertical adjustment.

M′ designates bars bolted to the trucks E and carrying at their lower ends adjustable screws or bolts j, which rest against the gates J and hold them closed while the hoppers F are being filled, but away from which the hoppers move as the beam tilts, and they move down toward the end thereof, thus freeing the gates and leaving them secured only by the latch-dogs K.

It is obvious that the operation of the scale is continuous and automatic.

The hoppers F may be made of a size to hold a known quantity, and a counter or register may be attached to record the number of vibrations of the beam.

What I claim as my invention, and desire to secure by Letters Patent, is—

1. The combination of a vibrating beam, two trucks movable thereon, weighing-hoppers supported by said trucks, a stationary supply-hopper having two outlets, weighted gates for closing said outlets, and projecting devices extending from said trucks, for engaging with and opening said gates as the trucks move inward, substantially as specified.

2. The combination of a vibrating beam, two trucks movable thereon, hoppers pivoted in said trucks, and stops for said trucks, adapted to be adjusted along said beam for balancing it, substantially as specified.

3. The combination of the vibrating beam, the trucks movable thereon, the hoppers pivoted in said trucks, and the adjustable stops for limiting the length of vibration of said beam, substantially as specified.

4. The combination of the vibrating beam, the trucks movable thereon, the weighing-hoppers pivoted in said trucks and provided with delivery-outlets, the hinged gates for said outlets, the pivoted latch-dogs for holding said gates closed, and cross-bars or abutments for disengaging said latch-dogs, substantially as specified.

5. The combination of the vibrating beam A, the frame B, the trucks E, movable upon said beam, the hoppers F, pivoted in said trucks, and the stationary supply-hopper G, supported at the top of said frame and having two outlets, f, substantially as specified.

6. The combination of the movable truck E, the pivoted weighing-hopper F, provided with an outlet, the hinged gate J, and the bar M, provided with the adjustable bolt or screw j, for bearing upon said gate, substantially as and for the purpose specified.

BERNHARD C. MEYER.

Witnesses:
JOHN WIEDMER,
L. SCHULENBERG.